United States Patent Office 3,507,165
Patented Apr. 21, 1970

3,507,165
SAFETY STEERING DEVICE FOR MOTOR VEHICLES
Karl Wilfert, Gerlingen-Waldstadt, and Béla Barényi, Stuttgart-Vaihingen, Germany, assignor to Daimler-Benz Aktiengesellschaft, Stuttgart-Unterturkheim, Germany
Filed Apr. 10, 1968, Ser. No. 720,048
Claims priority, application Germany, Apr. 11, 1967, D 52,757
Int. Cl. B62d 1/18
U.S. Cl. 74—492        12 Claims

ABSTRACT OF THE DISCLOSURE

A safety steering device for motor vehicles with a plastically deformable deformation member arranged between the steering wheel and the steering spindle in which the center of the base surface of the deformation member facing the steering wheel is offset downwardly with respect to the center of the steering wheel.

BACKGROUND OF THE INVENTION

The present invention relates to a safety steering for motor vehicles in which a plastically deformable deformation member consisting, for example, of sheet metal, is arranged between the steering wheel and the steering spindle, which in case of impact of the driver against the steering wheel caused by accidents converts at least a part of the impact energy into deformation work and therewith contributes to the protection of the driver.

Such types of deformation members, also referred to as impact pots are already known per se in the prior art.

The prior art deformation members are thereby so arranged that they extend coaxially to the center axis of the steering spindle. This means that the center of known padding plates serving as impact surfaces which cover the base surface of the deformation member facing the steering wheel and which project essentially over their entire circumference beyond this base surface of the deformation member uniformly by a predetermined amount, coincides with the center of the steering wheel.

However, numerous tests have demonstrated that with most accidents which are connected with an impact of the driver against the steering wheel, this impact takes place essentially against the lower half of the steering wheel deflecting or bending downwardly so that provision should be made within this area for a large impact surface which remains approximately in the plane of the steering wheel. With an impact surface, for example, in the form of padding plate whose center coincides with that of the steering wheel, however, as large as possible a surface of the padding plate is opposed by the requirement to enable a completely satisfactory vision of the driver onto the instruments of the vehicle within the area of the upper half of the steering wheel.

SUMMARY OF THE INVENTION

In order to fulfill these requirements and to avoid the disadvantages of the constructions known heretofore, a safety steering device for motor vehicles with a plastically deformable deformation member consisting, for example, of sheet metal and arranged between the steering wheel and the steering spindle is proposed in which, according to the present invention, the center of the base surface of the deformation member facing the steering wheel is offset downwardly with respect to the center of the steering wheel.

The base surface of the deformation member facing the steering wheel may be arranged thereby non-parallel to the plane of the steering wheel.

Accordingly, it is an object of the present invention to provide a safety steering which avoids by simple means the aforementioned shortcomings and drawbacks encountered in the prior art.

Another objected of the present invention resides in a safety steering device which provides greater safety for the driver in case fo accidents.

A further object of the present invention resides in a safety steering device which harmonizes the seemingly contradictory requirements for a large base surface of the deformation pot facing the steering wheel, on the one hand, and good visibility of the instruments on the part of the driver, on the other.

These and further objects, features, and advantages of the present invention will become more obvious from the following description when taken in connection with the accompanying drawing which shows, for purposes of illustration only, several embodiments in accordance with the present invention, and wherein.

Figure 1:
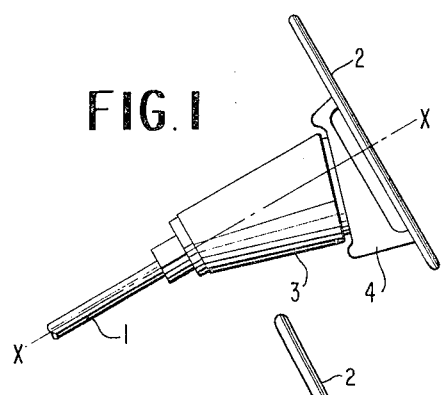
FIGURE 1 is a side elevational view of a safety steering device in accordance with the present invention.

Referring now to the drawing wherein like reference numerals are used throughout the various views to designate like parts, reference numeral 3 designates a deformation member arranged between the steering spindle 1 and the steering wheel 2, which is conically constructed and has an oval shape in cross section. The upper base surface of the deformation member 3 facing the steering wheel 2 is covered by a steering wheel hub body 4 which is preferably padded. The center point 5 of the upper base surface of the deformation member 3 facing the steering wheel 2 is offset downwardly by an amount d (FIGURE 2) with respect to the center axis X—X of the steering spindle 1 and of the steering wheel 2.

Figure 2:
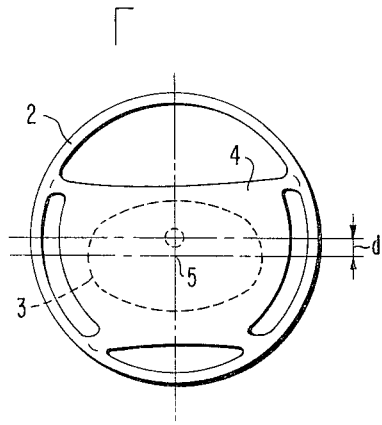
FIGURE 2 is a plan view on the steering wheel of FIGURE 1 taken in the direction of the center axis of the steering spindle.
Figure 3:
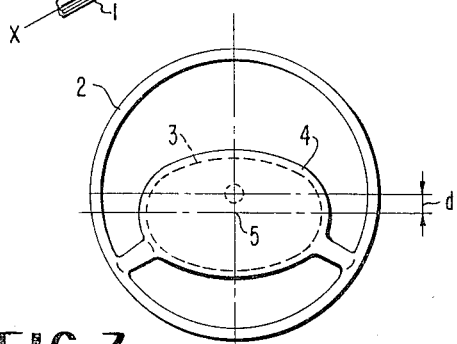
FIGURES 3 and 4 are plan views, corresponding to FIGURE 2, of two further embodiments of steering wheels in accordance with the present invention.
Figure 4:
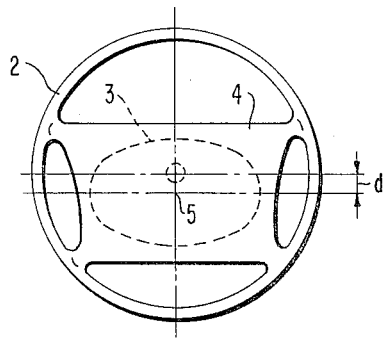

FIGURES 2, 3, and 4 differ from each other only in the configuration of the hub body 4 and of the spokes connecting the same with the steering wheel rim 2.

In the embodiment of FIGURE 2, the padded hub or plate body 4 is so shaped in relation to the steering wheel rim 2 that a relatively large aperture in the form of a segment is left on top of the steering wheel while a relatively smaller segment-shaped aperture is left at the bottom and two elongated apertures conforming to the circular shape of the rim 2 are provided on each side thereof.

FIGURE 4 differs from FIGURE 2 in that the secants forming the top and bottom apertures of FIGURE 2 are slightly curved concavely while in FIGURE 4 they are straight. Additionally, the lateral apertures in FIGURE 4 are oval-shaped rather than of substantially constant width as in FIGURE 2.

In FIGURE 3, the hub or plate body 4 is of oval shape itself and is connected with the steering wheel rim 2 by way of only two spokes extending radially within the lower part of the steering wheel rim.

Figure 5:
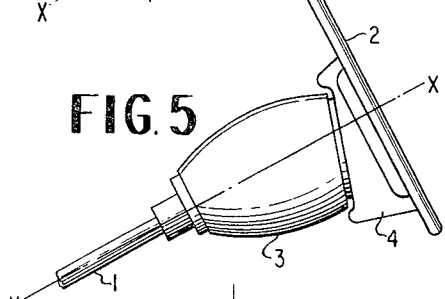
FIGURES 5 and 6 are side elevational views of a safety steering device in accordance with the present invention, wherein the deformation member has sides which are convex and concave, respectively.
Figure 6:
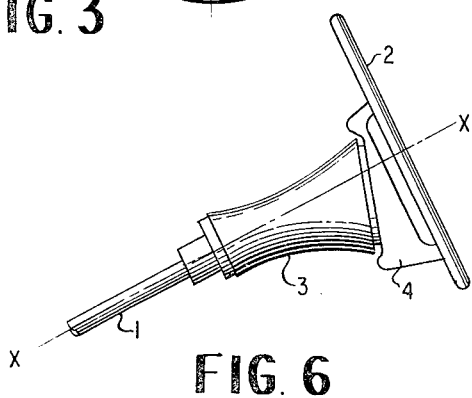

In FIGURE 5, the deformation member is shown having sides that are convex, while in FIGURE 6, the deformation member is shown having sides that are concave.

While we have shown and described several embodiments in accordance with the present invention, it is un-

We claim:

1. A safety steering device for motor vehicles with a plastically deformable deformation member arranged between the steering wheel and the steering spindle, characterized in that the center of the base surface of the deformation member facing the steering wheel is offset downwardly with respect to the center of the steering wheel.

2. A safety steering device according to claim 1, wherein the base surface of the deformation member facing the steering wheel is arranged non-parallel to the plane of the steering wheel.

3. A safety steering device according to claim 2, wherein at least said base surface is of a shape differing from the circular shape.

4. A safety steering device according to claim 3, wherein said shape is oval.

5. A safety steering device according to claim 3, wherein the outer surface, as seen in side elevation, of said deformation member, is conically shaped.

6. A safety steering device according to claim 3, wherein the outer surface, as viewed in side elevation, of said deformation member, is curved.

7. A safety steering device according to claim 6, wherein the curvature of the said outer surface is convex.

8. A safety steering device according to claim 6, wherein the curvature of said outer surface is concave.

9. A safety steering device according to claim 1, wherein at least said base surface is of a shape differing from the circular shape.

10. A safety steering device according to claim 9, wherein said shape is oval.

11. A safety steering device according to claim 1, wherein the outer surface, as seen in side elevation, of said deformation member, is conically shaped.

12. A safety steering device according to claim 1, wherein the outer surface, as viewed in side elevation, of said deformation member, is curved.

References Cited

UNITED STATES PATENTS

| | | | |
|---|---|---|---|
| 3,167,974 | 2/1965 | Wilfert | 74—552 |
| 3,285,091 | 11/1966 | Fiala | 74—552 |

MILTON KAUFMAN, Primary Examiner

U.S. Cl. X.R.

74—552